June 7, 1966      D. F. THORPE      3,254,986
INTEGRATED CHARRING AND ORE REDUCTION METHODS AND APPARATUS
Filed Nov. 17, 1961      4 Sheets-Sheet 1
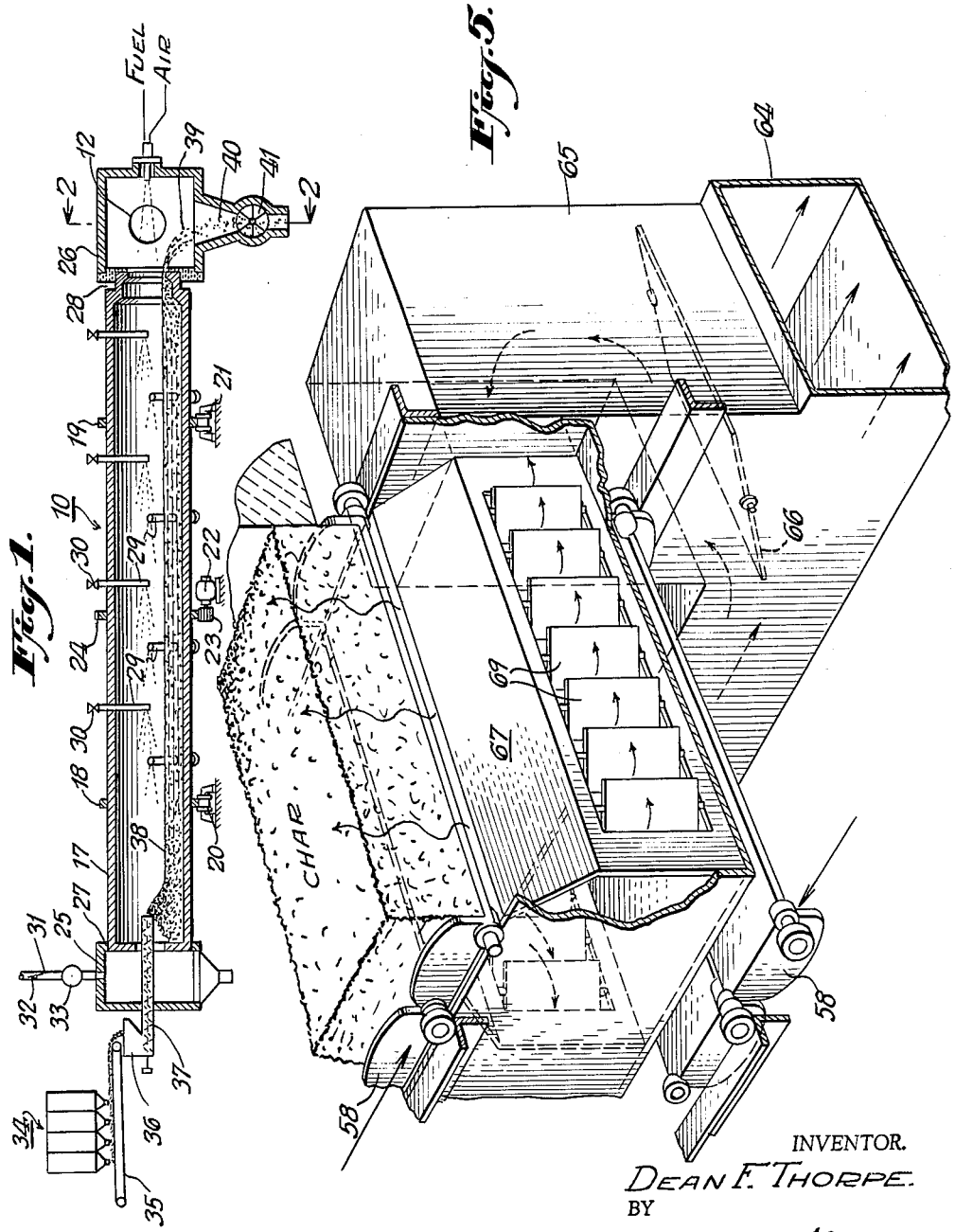
INVENTOR.
DEAN F. THORPE
BY
Ward, Neal, Haselton, Orme & McElhannon
ATTORNEYS.

June 7, 1966 D. F. THORPE 3,254,986
INTEGRATED CHARRING AND ORE REDUCTION METHODS AND APPARATUS
Filed Nov. 17, 1961 4 Sheets-Sheet 2
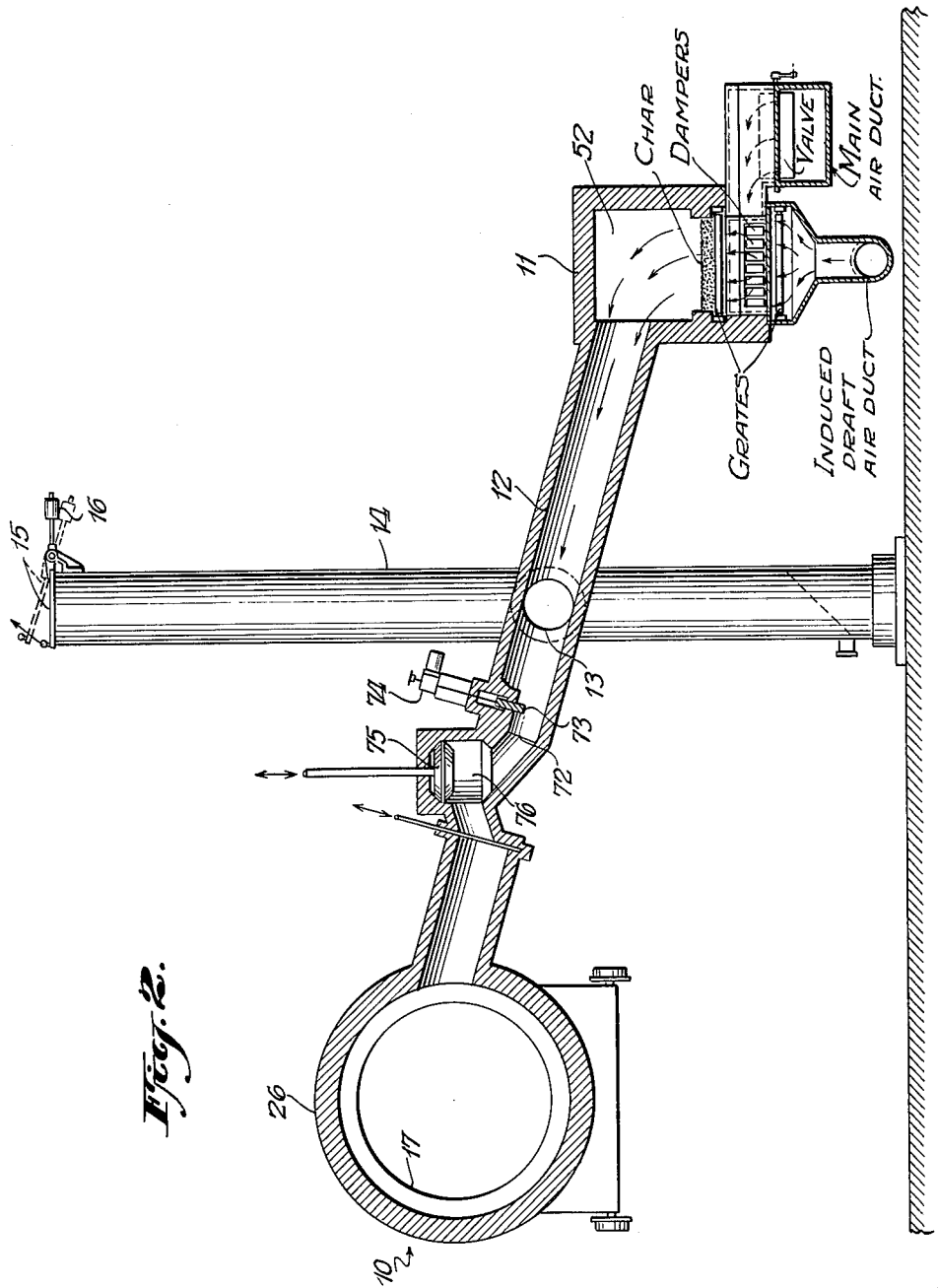
INVENTOR.
DEAN F. THORPE.
BY
Ward, Neal, Haselton, Orme, & McElhannon
ATTORNEYS.

June 7, 1966 D. F. THORPE 3,254,986
INTEGRATED CHARRING AND ORE REDUCTION METHODS AND APPARATUS
Filed Nov. 17, 1961 4 Sheets-Sheet 3
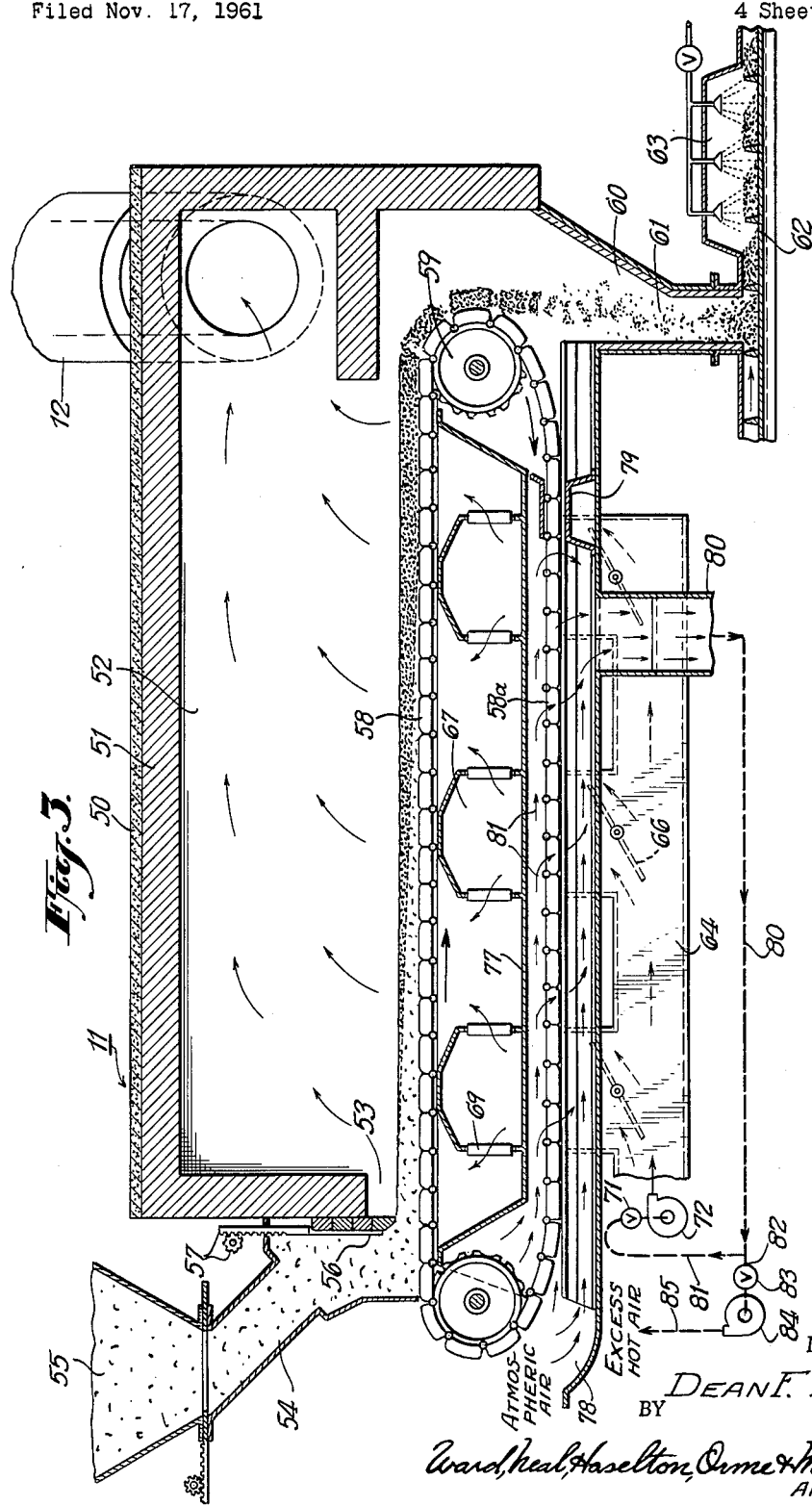
INVENTOR.
DEAN F. THORPE.
BY
Ward, Neal, Haselton, Orme & McElhannon
ATTORNEYS.

June 7, 1966  D. F. THORPE  3,254,986
INTEGRATED CHARRING AND ORE REDUCTION METHODS AND APPARATUS
Filed Nov. 17, 1961  4 Sheets-Sheet 4
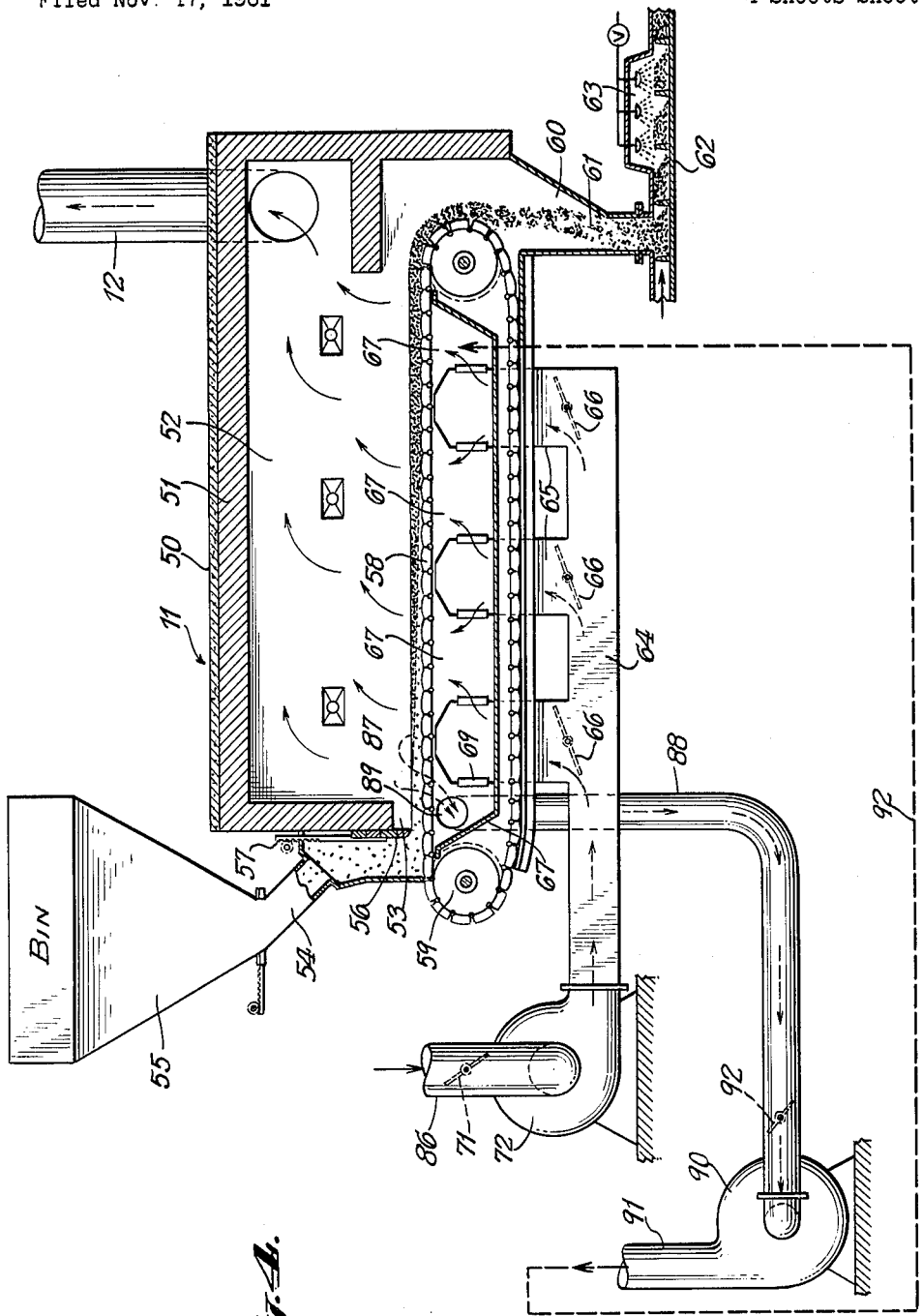
INVENTOR.
DEAN F. THORPE
BY
ATTORNEY.

United States Patent Office 3,254,986
Patented June 7, 1966

3,254,986
INTEGRATED CHARRING AND ORE REDUCTION METHODS AND APPARATUS
Dean F. Thorpe, Birmingham, Ala., assignor to R-N Corporation, New York, N.Y., a corporation of Delaware
Filed Nov. 17, 1961, Ser. No. 153,082
7 Claims. (Cl. 75—28)

This invention pertains to the direct reduction of iron ores and the like without fusion in the presence of hot combustible gases and solid carbonaceous fuel, and provides improved methods and apparatus therefor wherein the sensible heat values as well as the chemical heat values of the hot combustible gases resulting from the charring of coal are utilized in reduction of the ore. The invention also pertains to improvements in charring apparatus and methods, useful in ore reduction of the character aforesaid.

In processes as conventionally practiced using solid reducing agents for low temperature ore reduction, ore and the solid carbonaceous matter are mixed and heated up to reaction temperature. As the reaction temperatures are generally higher than the temperatures required for volatilization of the volatile matter contained in the reducing agent, these volatiles are usually lost to the process proper. Because the ore-carbon mixtures are heated up in countercurrent, usually in a rotary kiln, the volatile matter is distilled off at a temperature where its combustion is not needed and where its reducing power is not effective. In these conventional processes, therefore, the volatile matter can be utilized only outside the reactor, for instance, by combustion, for boiler heating or other plant heating applications. Thus, most of the solid state, ore reduction processes prefer the use of coke, coke breeze or low volatile anthracite rather than high volatile coal. However, in visualizing large commercial installations, the availability of low cost coke or coke breeze in sufficient quantity presents a serious problem, whereas coal is widely available at relatively low cost.

In order to provide for the utilization of coal in low temperature, solid reduction processes of the character aforesaid, it has been proposed in accordance with the invention set forth in a copending application of R. P. Smith, Serial No. 74,185, now Patent No. 3,126,277 filed December 6, 1960, to integrate with the ore reduction furnace, method and means external thereto for charring coal, the hot combustible gases from which are piped directly into the ore reduction furnace to provide the required hot combustible furnace atmosphere, and the hot char from which may also be fed directly into the furnace along with the ore for preheating the same and thereby expediting the reduction, or may be admixed with wet recycle char for drying the same.

In the said Smith application, one way proposed for accomplishing the above, is by the use of a traveling grate type of charring unit, the hot char gases from which are supplied to the discharge end of an ore reduction furnace of the rotary kiln type, preferably such as is described as to construction and operation in U.S. Patent 2,829,042 to O. Moklebust, incorporated by reference herein as discussed below.

The present invention provides improvements in such integrated charring and ore reduction techniques and in the traveling grate type of charring apparatus applicable thereto.

It has been discovered in the operation of such apparatus that whereas for optimum performance, the char unit requires a positive gas pressure environment, the ore reduction kiln requires a relatively strong negative gas pressure condition. Both units require that external air be excluded from the system except in the controlled amounts required for coal charring and ore reduction, respectively.

The present invention provides in accordance with one of its objectives, apparatus for supplying the hot char gases from the charring unit to the ore reduction kiln in such manner as to establish and maintain the requisite gas pressure differential between them. This comprises a refractory lined flue extending between the gas chamber of the char unit and the discharge end of the reduction kiln, and into which is built a constriction. This constriction is also provided with an adjustable refractory damper for varying the aperture of the constriction for precision throttling of the flow of hot gases. This regulating damper is adjustable by means of a reversible motor which is remotely controlled from the char unit panel board. The damper is adjusted in operation to establish on the venturi principle, the required positive gas pressure within the char unit, while any desired induced draft condition is selected for the kiln.

It is essential to proper functioning of this system that it be sealed against leakage of air, the uncontrolled entrance of which at extraneous points in variable amounts prevents proper control and operation. Correct operation of the charring unit requires introduction of air through the wind boxes beneath the grate only in amount to combust just sufficient of the gases evolved from the coal to char the coal without appreciably combusting the solids. Air introduced by leakage or otherwise in excess of this is wasteful of both gaseous and solid combustibles. With respect to the preferred rotary reduction kiln of the Moklebust patent, provided with valve regulated air inlet tubes along the same as described therein, air is introduced therethrough in regulated amounts such as to establish the optimum temperature profile for reducing the ore during its transit through the furnace, a condition which cannot be maintained if leakage of air into the furnace at a variable rate occurs.

A second feature of the combined or integrated operation as above described is also obtainable with the invention in that it is entirely feasible to operate two reduction kilns from a single traveling grate unit by operating one kiln at a higher induced draft than the other. The gas from the charring unit is thus distributed from a flue equipped with two orifice-regulating damper systems. The economies derived from producing a char or coke product in addition to the precise amount of process heat for one or two kilns (at closely regulated temperature conditions) make this application extremely well suited to the rotary kiln ore reduction process. The char unit is flexible enough to make rapid changing from two to one kiln operation feasible. This can be accomplished by reducing the coal feed rate into the char unit and closing off the appropriate flue connection.

In accordance with another aspect of the present invention, special cooling means are provided for the traveling grate of the char unit to prevent overheating with resulting ignition of the char by the grate bars themselves. It was discovered in operating an integrated char and ore reduction pilot plant of the character aforesaid, that there resulted a gradual accumulation of heat in the cast-iron grate bars forming the belt-like traveling grate of the char unit, which heat was not dissipated before each grate bar revolved around to receive the thin bed of green coal on its surface for another cycle in the furnace zone. It was found that after a period of about 30 to 48 hours of continuous operation, the grate bars reached temperatures of approximately 1700° F., which ignited coal at the interface between the grate surface and the coal bed.

To eliminate this condition, an air heat exchanger was evolved, consisting in modification of the conventional forced draft system for the furnace in such manner as to provide for cooling the return strand of the grate. This is accomplished in accordance with the invention by providing an air inlet duct which pulls fresh air at ambient temperature through and around the space provided in the furnace framework for the return strand of the grate bars. The air flow thus induced through this zone is removed from the furnace framework at a point just ahead of a sliding air seal which prevents air leakage into the furnace coke discharge chamber.

The heated air resulting from the countercurrent flow of air over the grate bars is in turn removed in an outlet air duct which connects to the forced draft fan for the furnace and to another auxiliary exhaust fan. The second exhaust fan is required for several reasons. It was found that a cooling temperature differential of about 700° F. is required for the return strand of the grate bars to accomplish sufficient heat dissipation to overcome the pickup of heat by the grate bars during the periods that they are exposed to the approximately 1900° F. atmosphere in the furnace discharge chamber. The required amount of cool air at ambient temperature, i.e., about 70° F. and 50% of relative humidity, to exchange that quantity of heat was found to be approximately 50% excess of that which the forced draft fan normally delivers to the air boxes of the furnace. The second consideration for utilizing the additional forced draft system in conjunction with the heat exchanger is it permits utilization of the sensible heat in the furnace to accelerate evaporation of raw coal moisture and thus to obtain more rapid ignition of the green coal from the exposed surface of the coal bed.

The traveling grate carbonization reaction mechanism depends upon the rate of oxygen addition to the coal. As above explained, only a sufficient quantity of oxygen is provided to obtain combustion of enough of volatile constituents to char the coal so that the fixed carbon is not appreciably attacked. The activation energy required for oxidation of most coals is about 15 kilo calories/mol and the temperature at which this reaction begins is about 752° F., with the maximum rate of volatile matter evolution at about 842° F. At temperatures below 700° F., very little activity is observed for either decomposition or oxidation. However, the mechanical considerations for the structural parts in the air box which are fabricated from carbon steel parts, dictate that temperatures below 450° F. are required to eliminate any possibility of plate warpage. Based on these considerations, it was determined that furnace inlet air temperatures of between 300 and 400° F. be used. This method of operation was tested and proved beneficial to the char unit operation. The temperature of the inlet air to the furnace is controlled by adjustment of dampers in the inlet air duct.

An advantage of this grate cooling system is that it makes possible the introduction of very high moisture coals such as lignites without the sacrifice of furnace capacity for carbonization. Another advantage is that the mechanical operation of the furnace is safeguarded by this more positive method of grate cooling than heretofore. Information obtained from grate stoker manufacturers has established that high maintenance costs are attributable to overheated grate conditions encountered in commercial traveling grate coking operations.

Another variation to the aforesaid preheated air method of drying raw coal as it enters the char furnace and comprising a further improvement according to the invention, consists in changing the air flow in the first air box from up draft to down draft. In this embodiment, an exhaust fan is so connected to the side of the first air box that hot furnace chamber gas is caused to pass down through the raw coal bed for a short period of time. In this manner the coal moisture is removed from the furnace environment without diluting the composition of the char gas with water vapor. The saturated exhaust gas thus obtained, containing considerable yellow smoke and fine carbon, is swept out of the first air box. In a pilot installation, the temperature of the gas measured in a four-inch diameter exhaust duct was found to be about 170° F.

Having thus described the invention in general terms, reference will now be had to the accompanying drawings for a more detailed description, wherein:

FIG. 1 is a more or less schematic, axial sectional elevation of a rotary kiln ore reduction furnace in accordance with said Moklebust patent and illustrating the flue connection from the charring unit for conveying the hot combustible gases from the charring furnace thereto;

FIG. 2 is a sectional elevation showing the interconnection of the rotary kiln and charring unit by the aforesaid refractory lined flue, having a built-in constriction and adjustable damper control for maintaining a selected gas pressure differential between charring unit and the ore reduction kiln;

FIG. 3 is a longitduinal sectional elevation of the traveling grate charring unit, illustrating the air heat exchanger embodiment of the invention for cooling the return strand of the grate bars and preheating the entering coal in the manner above described;

FIG. 4 is a longitudinal sectional elevation of the traveling grate charring unit, showing the improvement comprising the down draft arrangement for preheating the coal at the entrance to the unit;

FIG. 5 is an enlarged perspective view of a fragmentary grate portion of the charring unit showing one of the wind boxes and appurtenant air ducts for feeding air into the furnace through the upper strand of the traveling grate.

Referring to the drawings and more particularly for the moment to FIGS. 1 and 2, there is shown an ore reduction kiln 10 of the rotary kiln type in accordance with said Moklebust patent, a charring kiln 11 of the traveling grate type, and a constriction flue 12 interconnecting the two, the flue connecting to the discharge end housing of the kiln as shown. The flue 12 is also connected, as by means of a right angle extension 13, to a stack 14, topped by a damper 15, maintained normally closed as by means of a counter-balancing weight 16.

The ore reduction kiln, which is preferably constructed and operated in accordance with said Moklebust patent, comprises an elongated, tubular, rotary kiln drum 17, provided with a pair of spaced bearing rings 18, 19, circumscribing the same for rotatably supporting the kiln on rollers as at 20, 21. The kiln is rotated by means of a motor 22, to the shaft of which is keyed a pinion 23, meshing with a ring gear 24, mounted on the kiln and extending thereabout. Disposed at opposite ends of the rotary kiln 17, are stationary housings 25, 26, comprising, respectively, feed end and discharge end housings. Both ends of the rotary kiln unit 17 are equipped with special, fluid-tight, water-seals between the same and the housing, as at 27, 28. At longitudinally and radially spaced intervals along the rotary kiln 17, are mounted a series of air inlet tubes, as at 29, which extend from the exterior to the axis thereof. The exterior ends of these tubes are fitted with manually adjustable, air inlet valves as at 30, while the inner ends are provided with openings which are axially directed, as indicated by the arrows, for controlling the temperature and combustion conditions throughout the kiln, as described in said Mokelbust patent. The feed end housing 25 is surmounted by a stack 31. A damper 32 and blower 33 in this stack control the induced draft of the kiln.

At the feed end, surge bins 34 are provided for storage of ore, limestone, fresh coke and recycle coke, respectively, the selective discharge from which is fed by a belt conveyor 35 into a hopper 36, and thence by screw conveyor 37, into the kiln. Within the kiln the mixture of ore and coke and also limestone if required, forms a bed 38, which is fed progressively to the discharge end while being subjected to reduction conditions for metallizing the ore. The reduced ore is discharged as at 39, into the base of the discharge end housing 26, and delivered thence to the exterior through a chute 40 containing a star valve 41 for providing a gas seal.

Referring to FIGS. 3 and 5, the charring unit 11 consists in its essentials, of a housing 50 provided with a refractory lining 51, forming a substantially gas-tight chamber 52, provided with a gas outlet to the aforesaid flue 12. The chamber 52 is provided with a fuel feed opening as at 53. A chute 54 leads from a fuel hopper 55 to the opening 53. The feed opening is provided with a gate 56, operated by a mechanism, shown partially at 57, to control the depth of the coal bed on the grate.

Within the chamber 52 is mounted a carrier, in this case a continuous traveling chain grate 58, of suitable standard design and suitably driven by a standard design and suitably driven by a standard drive, as at 59. At the discharge end of the chain grate 58 and below it, is a coke receiving hopper 60, which discharges the coke 61 onto the coke drag conveyor 62 wherein it is cooled by a water spray, as at 63.

Below the grate 58, the furnace is provided with a horizontally extending air inlet duct, as at 64, which connects with vertically extending ducts as at 65, provided with dampers as at 66, for controlling the air flow thereinto. The vertical ducts 65 extend to separate air boxes, which in turn extend horizontally beneath the upper strand of the chain grate 58, as at 67, from which the air passes to and through the upper strand of the grate 58 through adjustable louvre vanes as at 69. Air under pressure is fed to duct 64 through a vortex control damper 71 and blower 72 as discussed below.

Reverting to FIG. 2, as the coal is charred in the charring unit 11, the hot combustible gases evolved therefrom into the furnace chamber 52, pass directly thence through the flue 12 into the discharge end housnig 26 of the rotary kiln 10. For providing a gas pressure differential as between the gas pressures within the chamber 52 of the charring furnace 11 and the rotary kiln 10, respectively, there is built into the refractory lining of the flue 12, a constricted section, as at 72, in which is mounted an adjustable refractory damper 73, which is remotely controlled from the charring unit panel board (not shown), by means of a mechanism partially shown at 74, which damper provides for precision throttling of the flow of hot gases from the charring kiln 11 into the ore reducing kiln 10. The hot gas regulating damper 73 is adjusted to give a positive gas pressure within the char unit 11, while permitting any desired induced draft condition in the ore reducing kiln 10, the latter effected by means of the damper 32 and blower 33 in the stack 31 of the reduction kiln, FIG. 1. Also built into the flue 12 is an emergency shut-off valve and valve chamber 75, 76. The positive gas pressure in chamber 52 of the charring unit prevents air from leaking into the same, as for example through the feeding opening 53, etc.

Reverting to FIG. 3, there is shown at the bottom of the drawing, the air heat exchanger for grate cooling and also for preheating the air supplied to the furnace to accelerate evaporation of moisture from the raw coal and thereby expedite its ignition. This apparatus comprises a tubular air duct 77, of sheet metal or the like through which the return strand of the traveling grate is fed. This duct is open to atmosphere at the feed end of the furnace, as at 78, and is substantially closed by a sliding air seal near the discharge end, as at 79, to prevent air leakage into the furnace coke discharge chamber 60. An air exhaust duct 80 connects to duct 77 just ahead of the sliding seal 79, and extends to the feed end of the furnace, where it connects to a pair of ducts 81, 82, the first of which comprising the forced draft fan system for the furnace extends through the vortex control damper 71 and blower 72 to the air inlet duct 64 which supplies air to the furnace as above described. The second duct extends through a vortex control damper 83, and an auxiliary exhaust fan 84, to the outer atmosphere, as at 85.

In operation, cool air at ambient temperatures is drawn into the entrance 78 of the heat exchanger duct 77 and flows therein countercurrent to the direction of travel of the return strand of the grate, thereby to cool the same by exchange of heat to the entering air. The so heated air is drawn off through the exhaust duct 80 by blowers 72, 84, and fed in part through the first into the furnace supply, air inlet duct 64, and in part through the second to atmospheric exhaust. For reasons above explained, the volumetric rate of cool air flow through the heat exchanger duct is so adjusted by means of dampers 71, 83, as to cool the grate bars to the extent of about 700° F. in passing through the heat exchanger duct 77, and such that the inlet air enters the furnace duct at about 300–400° F. for moisture drying the raw coal fed into the furnace.

Reference will now be had to FIG. 4 which shows the down draft arrangement at the first air box for drying and preheating the entering coal. In this embodiment, inlet air at ambient temperatures is drawn through the furnace inlet air duct 86 and through the vortex control damper 71 by the forced draft fan 72. This forces air into and along the inlet air duct 64, supplying the furnace to provide up-draft air to chamber 52, through all of the wind boxes 67, except the first, the louvre vanes 69 to which are closed. Down-draft gases from the furnace atmosphere in chamber 52, are caused to flow through the grate adjacent the furnace entrance and thence into and through the first wind box, as indicated by the arrows 87, by means of an exhaust duct 88, extending from the first wind box, as at 89, to the exhaust fan 90, which discharges the hot gases to the outer atmosphere through outlet 91. In this manner the moisture is removed from the coal near the furnace entrance 53, without diluting the char gas in the furnace chamber 52, with water vapor. Duct 88 contains the usual control damper 92 for controlling the gas flow.

As above stated, the down-draft exhaust gases drawn off through duct 88 are in general saturated with moisture and contain considerable yellow smoke and fine carbon, the temperature being on the order of about 200° F. In accordance with a further aspect of the invention, these exhaust gases may advantageously be re-introduced into the coking system through the last air box 67, i.e., prior to coke discharge, as indicated by the dashed line 92, thereby to provide gas enrichment within the chamber 52 by passing the stream upwards through the incandescent coke bed to obtain the well-known water gas reaction. Since the water gas reaction is strongly endothermic, this modification has the additional advantages that it will afford excellent temperature control of the char gas leaving chamber 52 through conduit 12, and at the same time provide gas enrichment of the hot combustible gases transmitted through flue 12 to the ore reduction kiln.

It will be understood, of course, that the preheated inlet air arrangement of FIG. 3 may be combined with the down-draft preheating adaptation of FIG. 4 for the char unit.

What is claimed is:
1. In a process involving an ore reduction furnace and a charring furnace for the integrated reduction of iron ore and the like and concurrent charring of a high volatile, solid carbonaceous reductant, the method which comprises: charring said reductant by partial combustion thereof with evolution of hot combustible gases in a positive gas pressure environment, piping said hot gases into said ore reduction furnace while subjecting the same to gas pressure reduction in transit, and reducing said ore in said reduction furnace in the presence of said hot gases at the resulting lower pressure thereof.

2. In a process involving a rotary ore reduction kiln and a traveling grate type of charring furnace for integrated reduction of iron ore and the like and concurrent charring of a high volatile, solid carbonaceous reductant, the method which comprises: charring said reductant by partial combustion thereof in said charring furnace with evolution of hot combustible gases and while maintaining a positive gas pressure therein, piping said hot gases to and into said ore reduction furnace, while subjecting to gas pressure reduction in transit, from positive to negative, and reducing said ore in said rotary kiln under said negative gas pressure conditions in the presence of said hot combustible gases.

3. Apparatus for integrated reduction of iron ore and the like, and for concurrent charring of a high volatile, solid carbonaceous reductant which comprises: a charring furnace having means for charring said reductant by partial combustion thereof with evolution of hot combustible gases, while maintaining said gases under a first preselected gas pressure by means of adjustable valves which control the flow of air under positive pressure into the furnace; an ore reduction furnace for reducing said ore in the presence of said gases, said ore reduction furnace having the gas pressure therein at a second selected pressure differing from the first and regulated by an induced draft means, a conduit interconnecting said furnaces said conduit including portions of differing cross-sectional areas for providing a change in gas pressure with respect to the flow of said hot gases therethrough, said change conforming to the difference between said first and second pressures.

4. Apparatus for integrated reduction of iron ore and the like, and for concurrent charring of a high volatile, solid carbonaceous reductant, which comprises: a charring furnace having means for charring said reductant by partial combustion thereof with evolution of hot combustible gases, maintained under a first selected gas pressure therein by means of adjustable valves which control the flow of air under positive pressure into the furnace; an ore reduction furnace having means for reducing said ore in the presence of said hot gases under a lower gas pressure than said first; a conduit interconnecting said furnaces for transporting said hot gases from said charring furnace to and into said ore reduction furnace, said conduit containing means for restricting the flow of said gases therethrough, adjustable to provide a selected drop in pressure of said gases transported from said charring furnace to said ore reduction furnace, corresponding to the drop from said first to said lower pressure.

5. Integrated ore reduction and charring apparatus comprising: an ore reduction furnace including a tubular rotary kiln extending between stationary feed end and delivery end housings in substantially air-sealed relation thereto, valve means for establishing and maintaining an induced draft through said kiln, to provide a first preselected gas pressure therein; a charring furnace including an endless grate and means for moving the same through a charring oven, means for feeding a high volatile, solid carbonaceous reductant in comminuted form onto said grate, an adjustable valve for regulating the flow of air under a positive pressure, such air passing through said grate and into said oven for charring said reductant with evolution of hot combustible gases into said oven while maintaining a higher gas pressure therein than said reduction furnace, a conduit interconnecting said oven with delivery end housing of said reduction furnace in gas-sealed relation; said conduit containing a restriction, and adjustable means therein for establishing a gas pressure drop therein equal to the difference between said first and said higher pressures.

6. Integrated ore reduction and charring apparatus comprising: a rotary, ore reduction kiln penetrated by valve controlled gas inlet ducts spaced therealong, induced draft means for establishing and maintaining a preselected gas pressure within said kiln, a charring furnace for charring a high volatile, solid carbonaceous reductant by partial combustion thereof with evolution of hot gases under positive pressure into a chamber thereof substantially sealed against the outer atmosphere, means for supplying air to the furnace under a positive pressure, adjustable valves which control the flow of air under positive pressure into the charring furnace, a conduit interconnecting said ore reduction and charring furnaces for transporting said hot combustible gases from the latter to the former, said conduit having adjustable means for restricting the flow of gases therethrough for establishing and maintaining a preselected gas pressure differential as between the portion thereof connected to said charring furnace and the portion thereof connected to said ore reduction kiln.

7. Integrated ore reduction and charring apparatus, comprising: an ore reduction furnace including a rotary kiln extending between stationary feed end and discharge end housing, induced draft means for establishing and maintaining a preselected gas pressure within said furnace, a charring furnace for charring a high volatile, solid carbonaceous reductant material by partial combustion thereof, said furnace including a link-type endless grate, and means for progressively moving a strand thereof through a charring oven, means for progressively moving said carbonaceous material in comminuted form onto said grate strand and for supplying air therethrough under pressure into said oven, for charring said material with evolution of hot combustible gases maintained under preselected pressure in said oven by means of adjustable valves which control the flow of air under positive pressure through the grate, a conduit interconnecting said oven and the discharge end housing of said ore reduction furnace, for transporting said hot gases thereto, said conduit containing a section of restricted cross-sectional area, and adjustable damper means therein for establishing and maintaining a preselected gas pressure differential, as between the gas pressure in said oven and that in said kiln.

References Cited by the Examiner

UNITED STATES PATENTS

| | | | |
|---|---|---|---|
| 2,151,849 | 3/1939 | Hardy et al. | 202—131 |
| 2,380,930 | 8/1945 | Andersen et al. | 202—117 X |
| 2,829,042 | 4/1958 | Moklebust | 75—36 |
| 2,877,108 | 3/1959 | Smith | 75—36 |
| 2,903,400 | 9/1959 | Poindexter et al. | 202—28 |
| 2,945,755 | 7/1960 | Schulz | 266—21 |
| 2,987,307 | 6/1961 | Homan | 266—21 |
| 3,005,699 | 10/1961 | Erck et al. | 266—21 X |
| 3,011,772 | 12/1961 | Rouaux | 266—24 |
| 3,013,951 | 12/1961 | Mansfield | 202—117 |
| 3,024,101 | 3/1962 | Erck et al. | 266—21 X |
| 3,126,277 | 3/1964 | Smith | 75—36 |

JOHN F. CAMPBELL, *Primary Examiner.*

RAY K. WINDHAM, JAMES H. TAYMAN, JR., *Examiners.*

F. R. LAWSON, J. J. MULLEN, *Assistant Examiners.*